(12) United States Patent
Abe

(10) Patent No.: US 7,906,883 B2
(45) Date of Patent: Mar. 15, 2011

(54) AXIAL GAP MOTOR

(75) Inventor: Shoei Abe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/474,777

(22) Filed: May 29, 2009

(65) Prior Publication Data

US 2009/0295246 A1    Dec. 3, 2009

(30) Foreign Application Priority Data

Jun. 2, 2008 (JP) ................................. 2008-144918
Jun. 2, 2008 (JP) ................................. 2008-144919

(51) Int. Cl.
*H02K 1/27* (2006.01)

(52) U.S. Cl. ......... 310/156.64; 310/156.14; 310/156.29; 310/156.31; 310/156.65; 310/156.82

(58) Field of Classification Search ............ 310/156.08–156.16, 156.23, 156.29–156.32, 156.35, 310/156.38–156.41, 156.43–156.45, 156.53, 310/156.56, 156.82, 268, 156.64–156.65

See application file for complete search history.

(56) References Cited

U.S. PATENT DOCUMENTS

| | | | |
|---|---|---|---|
| 4,007,387 A | 2/1977 | Rustecki | |
| 4,095,150 A | 6/1978 | Senckel | |
| 4,864,175 A * | 9/1989 | Rossi | ....................... 310/156.29 |
| 4,996,457 A | 2/1991 | Hawsey et al. | |
| 5,245,238 A | 9/1993 | Lynch et al. | |
| 5,334,899 A * | 8/1994 | Skybyk | ........................ 310/268 |
| 5,387,854 A | 2/1995 | McCleer et al. | |
| 5,394,321 A | 2/1995 | McCleer et al. | |
| 5,397,953 A | 3/1995 | Cho | |
| 5,642,009 A | 6/1997 | McCleer et al. | |
| 5,907,210 A | 5/1999 | Chaix | |
| 5,925,965 A | 7/1999 | Li et al. | |
| 5,955,809 A | 9/1999 | Shah | |
| 6,373,162 B1 | 4/2002 | Liang et al. | |
| 7,315,102 B2 | 1/2008 | Minagawa | |
| 7,679,260 B2 * | 3/2010 | Yamamoto et al. | ........... 310/268 |
| 7,737,594 B2 | 6/2010 | Abe et al. | |
| 2004/0070307 A1 | 4/2004 | Haugan et al. | |
| 2005/0194855 A1 | 9/2005 | Hasebe et al. | |
| 2005/0285467 A1 | 12/2005 | Shimizu | |
| 2007/0018520 A1 | 1/2007 | Kaneko et al. | |

(Continued)

FOREIGN PATENT DOCUMENTS

EP       1612913 A2    1/2006

(Continued)

*Primary Examiner* — Tran N Nguyen
(74) *Attorney, Agent, or Firm* — Arent Fox LLP

(57) ABSTRACT

A rotor includes a rotor frame having a plurality of ribs which are disposed at predetermined intervals in a circumferential direction and which extend in a radial direction, and a shaft portion and a rim portion which are provided at inside diameter sides and outside diameter sides of the plurality of ribs, respectively, main magnet portions which are disposed individually between the ribs which are adjacent to each other in the circumferential direction, and a plurality of sub-magnet portions which are disposed on at least one sides of the ribs in the rotational axis direction, and wherein a rigid portion is formed in an area where the sub-magnet portions are projected in the radial direction relative to an area where the rib is projected in the radial direction in a cross section of the rim portion taken along the rotational axis direction.

19 Claims, 16 Drawing Sheets

U.S. PATENT DOCUMENTS

| | | |
|---|---|---|
| 2007/0170802 A1 | 7/2007 | Potoradi |
| 2008/0129136 A1 | 6/2008 | Abe et al. |
| 2008/0290752 A1 | 11/2008 | Yamamoto et al. |
| 2009/0243422 A1 | 10/2009 | Atarashi et al. |
| 2009/0251021 A1 | 10/2009 | Atarashi et al. |
| 2009/0295245 A1 | 12/2009 | Abe et al. |
| 2010/0090555 A1 | 4/2010 | Tajima et al. |

FOREIGN PATENT DOCUMENTS

| | | |
|---|---|---|
| EP | 1850451 A1 | 10/2007 |
| JP | 59-230453 A | 12/1984 |
| JP | 2-79174 U | 6/1990 |
| JP | 6-500457 A | 1/1994 |
| JP | 9-168263 A | 6/1997 |
| JP | 10-271784 A | 10/1998 |
| JP | 3062085 U | 6/1999 |
| JP | 11-511948 A | 10/1999 |
| JP | 2000-197301 A | 7/2000 |
| JP | 2000-262026 A | 9/2000 |
| JP | 2001-136721 A | 5/2001 |
| JP | 2002-112481 A | 4/2002 |
| JP | 2005-094955 A | 4/2005 |
| JP | 2005-269778 A | 9/2005 |
| JP | 2005-341696 A | 12/2005 |
| JP | 2006-166635 A | 6/2006 |
| JP | 2006-222131 A | 8/2006 |
| JP | 2006-527578 A | 11/2006 |
| JP | 2006-345627 A | 12/2006 |
| JP | 2007-028868 A | 2/2007 |
| JP | 2008-22663 A | 1/2008 |
| JP | 2008-48497 A | 2/2008 |
| JP | 2008-104278 A | 5/2008 |
| WO | WO 96/29774 A1 | 9/1996 |
| WO | WO 2004/109894 | 12/2004 |
| WO | WO 2006/077812 A1 | 7/2006 |

* cited by examiner

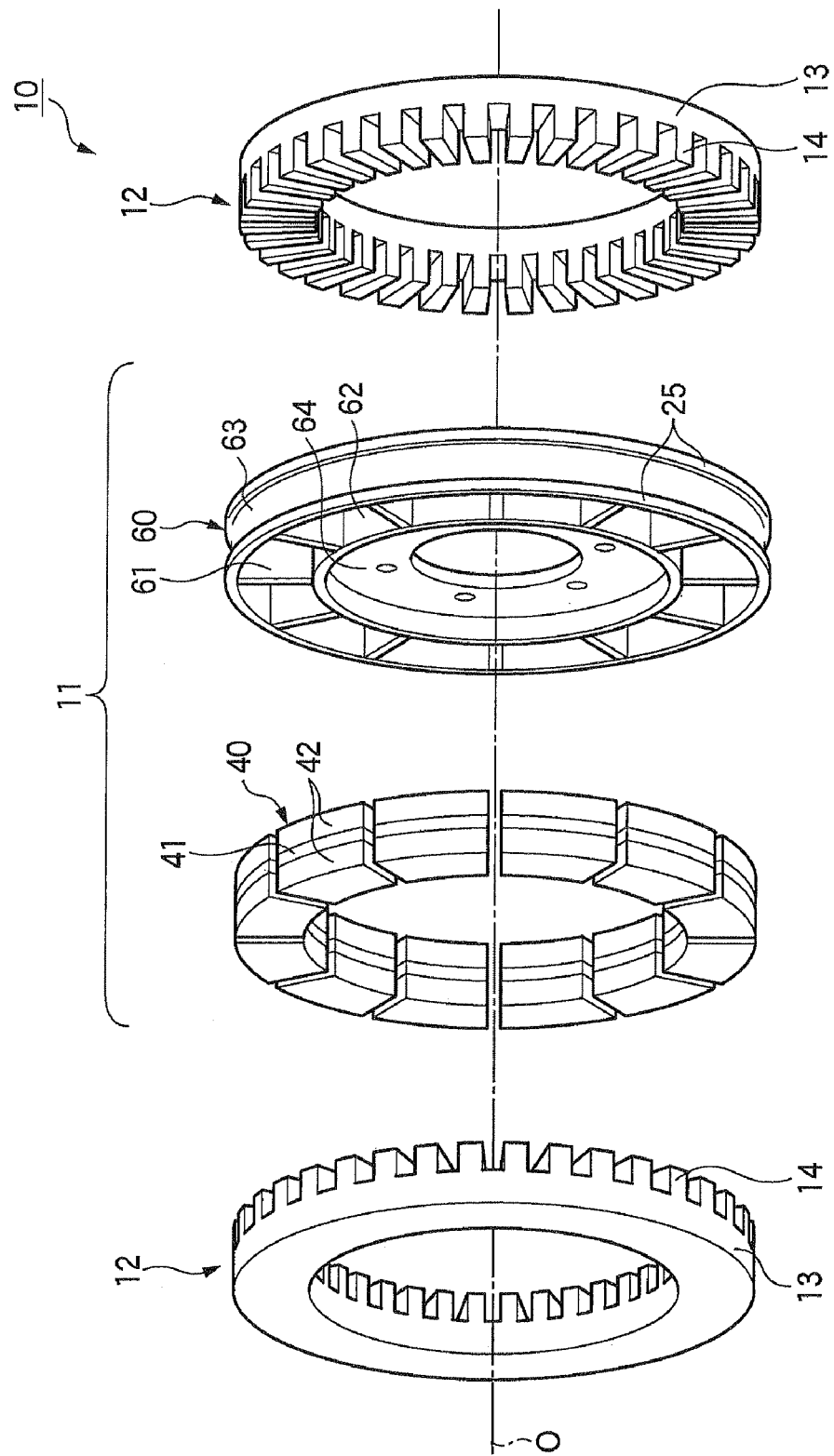

AXIAL GAP MOTOR

This application claims the priority of Japan Application Nos. P2008-144918 and P2008-144919, both filed Jun. 2, 2008, the entire specifications, claims and drawings of which are incorporated herewith by reference.

TECHNICAL FIELD

The present disclosure relates to an axial gap motor and more particularly to an improvement to a rotor thereof.

RELATED ART

In the related art, there have been known permanent magnet synchronous machines which include a pair of stators which are disposed to confront each other in such a manner as to hold therebetween a rotor from both sides thereof in a rotational axis direction, so that magnetic flux loops are formed via the pair of stators relative to a field magnetic flux by a permanent magnet of a rotor (for example, refer to Patent Document 1 and 2).

[Patent Document 1]JP-A-10-271784
[Patent Document 2]JP-A-2001-136721

A permanent magnet synchronous machine according to Patent Document 1 configures an axial gap motor as a permanent magnet synchronous machine in which stators are disposed to confront a rotor made up of bipolar magnets or a rotor made up of a combination of single-polar magnets and magnetic materials. In addition, a permanent magnet synchronous machine according to Patent Document 2 configures an axial gap motor as a permanent magnet synchronous machine in which stators are disposed to confront a rotor which employs bipolar magnets and segmental salient pole magnetic materials.

In addition, as the permanent magnet synchronous machines according to Patent Document 1 and 2 above, there is known an axial gap motor 100 as is shown in FIG. 13. This axial gap motor 100 includes a rotor 101 which can rotate about a rotational axis and a pair of stators 102 which are disposed to confront the rotor 101 in such a manner as to hold therebetween the rotor 101 from both sides thereof in a rotational axis direction. The rotor 101 is made up by magnetic circuit elements such as main magnet portions 103, sub-magnet portions 104 and magnetic members 105 being accommodated in a rotor frame 106 which is made of a non magnetic material. In addition, the rotor frame 106 includes a plurality of ribs 107 which are disposed at predetermined intervals in a circumferential direction and which extend in a radial direction and a shaft portion 108 and a rim portion 109 which are connected together by the plurality of ribs 107.

Incidentally, in the axial gap motor 100, when the rotor rotates at high speeds, since a large centrifugal force is exerted on the rim portion 109 of the rotor frame 106, as is shown in FIGS. 14A and 14B, there has been a possibility that the rim portion 109 is deformed radially outwards as is indicated by broken lines in the figures. In addition, there has been a possibility that the main magnet portions 13, the sub-magnet portions 14 and the magnetic members 15 are made easy to get unfastened axially outwards.

In addition, as the permanent magnet synchronous machines according to Patent Document 1 and 2 above, there is known an axial gap motor 100 as is shown in FIG. 15. This axial gap motor 100 includes a rotor 101 which can rotate about a rotational axis and a pair of stators 102 which are disposed to confront the rotor 101 in such a manner as to hold therebetween the rotor 101 from both sides thereof in a rotational axis direction. The rotor 101 is made up by magnetic circuit elements such as main magnet portions 103, sub-magnet portions 104 and magnetic members 105 being accommodated in a rotor frame 106 which is made of a non magnetic material. In addition, the rotor frame 106 includes a plurality of ribs 107 which are disposed at predetermined intervals in a circumferential direction and which extend in a radial direction and a shaft portion 108 and a rim portion 109 which are connected together by the plurality of ribs 107. Further, an annular member 110 is press fitted on an outer circumferential portion of the rim portion 109 so as to be secured thereto.

Incidentally, in the axial gap motor 100, since the annular member 110 is press fitted on the outer circumferential portion of the rim portion 109 of the rotor frame 106, stress generated at roots of the ribs 107 when the rotor rotates at high speeds can be reduced, whereby a high-speed rotational operation of the rotor 101 is enabled. However, as is shown in FIG. 16, after the press fitting of the annular member 110, stress generated in the ribs 107 and portions lying in the vicinity of the connecting portions between the ribs 107 and the rim 109 (dotted portions in FIG. 16) is increased to a high level, generating marked variation in stress distribution in the rotor frame 106. In addition, a large-scale and expensive press fitting apparatus which can generate a high press fitting load has been necessary to press fit the annular member 110 with a larger interference. Further, there has been a possibility that a drawback such as seizure occurs in the course of press fitting of the annular member 110 on the rotor frame 106.

SUMMARY

Exemplary embodiments of the present invention provide an axial gap motor which can increase the rigidity of a rim portion of a rotor frame so as to suppress the deformation of the rim portion due to centrifugal force generated at the time of high-speed rotation to a minimum level.

In addition, exemplary embodiments of the present invention provide an axial gap motor which can reduce the variation in stress distribution in the rotor frame and which can reduce the press fitting load.

An axial gap motor according to a first aspect of the invention is an axial gap motor including a rotor (for example, a rotor 11 in an embodiment) which can rotate about a rotational axis (for example, a rotational axis O in the embodiment) and a stator (for example, a stator 12 in the embodiment) which is disposed to confront the rotor from at least one side thereof in a rotational axis direction, wherein the rotor includes a rotor frame (for example, a rotor frame 20 in the embodiment) having a plurality of ribs (for example, ribs 21 in the embodiment) which are disposed at predetermined intervals in a circumferential direction and which extend in a radial direction, and a shaft portion (for example, a shaft portion 22 in the embodiment) and a rim portion (for example, a rim portion 23 in the embodiment) which are provided at inside diameter sides and outside diameter sides of the plurality of ribs, respectively, main magnet portions (for example, main magnet portion 41 in the embodiment) which are magnetized in the rotational axis direction and are disposed individually between the ribs which are adjacent to each other in the circumferential direction, and a plurality of sub-magnet portions (for example, sub-magnet portions 43 in the embodiment) which are magnetized in a direction which is orthogonal to the rotational axis direction and the radial direction and are disposed on at least one sides of the ribs in the rotational axis direction, and wherein a rigid portion (for example, a rigid portion 25 in the embodiment) is formed in an area where the sub-magnet portions are projected in the radial direction relative to an area where the rib is projected in the radial direction in a cross section of the rim portion taken along the rotational axis direction.

An axial gap motor according to a second aspect of the invention is an axial gap motor including a rotor which can rotate about a rotational axis and a stator which is disposed to confront the rotor from at least one side thereof in a rotational axis direction, wherein the rotor includes a rotor frame having a plurality of ribs which are disposed at predetermined intervals in a circumferential direction and which extend in a radial direction, and a shaft portion and a rim portion which are provided at inside diameter sides and outside diameter sides of the plurality of ribs, respectively, main magnet portions which are magnetized in the rotational axis direction and are disposed individually between the ribs which are adjacent to each other in the circumferential direction, and magnetic members (for example, magnetic members 42 in the embodiment) which are disposed on at least one sides of the main magnet portions in the rotational axis direction, and wherein a rigid portion is formed in an area where the magnetic members are projected in the radial direction relative to an area where the main magnet portion is projected in the radial direction in a cross section of the rim portion taken along the rotational axis direction.

An axial gap motor according to a third aspect of the invention is an axial gap motor as set forth in the first or second aspect of the invention, wherein the rigid portion is provided by attaching an annular member (for example, an annular member 26 in the embodiment) to an outer circumference of the rim portion.

An axial gap motor according to a fourth aspect of the invention is an axial gap motor as set forth in the first or second aspect of the invention, wherein an inside diameter of the rim portion is inclined in such a manner as to be gradually reduced as the rim portion extends axially outwards from an axial center of the rim portion.

An axial gap motor according to a fifth aspect of the invention is an axial gap motor as set forth in the first or second aspect of the invention, wherein the rigid portion is made of a non magnetic material.

According to the axial gap motor according to the first aspect of the invention, since the rigid portion is formed in the area where the sub-magnet portions are projected in the radial direction relative to the area where the rib is projected in the radial direction in the cross section of the rim portion taken along the rotational axis direction, the rigidity of the rim portion of the rotor frame can be increased. By this, the deformation of the rim portion by centrifugal force generated when the rotor rotates at high speeds can be suppressed to a minimum level. In addition, since the deformation of the rim portion is suppressed to the minimum level, the main magnet portions, the sub-magnet portions and the magnetic members are prevented from getting unfastened axially outwards.

According to the axial gap motor according to the second aspect of the invention, since the rigid portion is formed in the area where the magnetic members are projected in the radial direction relative to the area where the main magnet is projected in the radial direction in the cross section of the rim portion taken along the rotational axis direction, the rigidity of the rim portion of the rotor frame can be increased. By this, the deformation of the rim portion by centrifugal force generated when the rotor rotates at high speeds can be suppressed to a minimum level. In addition, since the deformation of the rim portion is suppressed to the minimum level, the main magnet portions and the magnetic members are prevented from getting unfastened axially outwards.

According to the axial gap motor according to the third aspect of the invention, since the rigid portion is provided by attaching the annular member to the outer circumference of the rim portion, in the even that the annular member is molded by the use of a material having a high tensile strength, the rotor frame can be formed by a material which has a relatively low strength or inexpensive, thereby making it possible to reduce the manufacturing costs of the rotor. In addition, since the annular member has a simple shape which is easy to be worked, the productivity becomes high, the manufacturing costs can be reduced and the deformation of the rim portion can effectively be suppressed.

According to the axial gap motor according to the fourth aspect of the invention, since the inside diameter of the rim portion is inclined in such a manner as to be gradually reduced as the rim portion extends axially outwards from the axial center of the rim portion, even in the event that the axial end portions of the rim portion are deformed in such a manner as to be opened radially outwards, the main magnet portions, the sub-magnet portions and the magnetic members can be prevented from being offset axially outwards because the main magnet portions, the sub-magnet portions and the magnetic members are in engagement with the inclined surface.

According to the axial gap motor according to the fifth aspect of the invention, since the rigid portion is made of the non magnetic material, the short circuit of magnetic flux through the rigid portion can be prevented. By this, a reduction in generated torque of the motor and a reduction in efficiency can be prevented.

Further, an axial gap motor according to a sixth aspect of the invention is an axial gap motor including a rotor (for example, a rotor 11 in an embodiment) which can rotate about a rotational axis (for example, a rotational axis O in the embodiment) and a stator (for example, a stator 12 in the embodiment) which is disposed to confront the rotor from at least one side thereof in a rotational axis direction, wherein the rotor includes a rotor frame (for example, a rotor frame 20 in the embodiment) having a plurality of ribs (for example, ribs 21 in the embodiment) which are disposed at predetermined intervals in a circumferential direction and which extend in a radial direction, and a shaft portion (for example, a shaft portion 22 in the embodiment) and a rim portion (for example, a rim portion 23 in the embodiment) which are provided at inside diameter sides and outside diameter sides of the plurality of ribs, respectively, main magnet portions (for example, main magnet portion 41 in the embodiment) which are magnetized in the rotational axis direction and are disposed individually between the ribs which are adjacent to each other in the circumferential direction, and an annular member (for example, an annular member 125 in the embodiment) which is press fitted on an outer circumferential portion of the rim portion, and wherein a relief portion (for example, a relief groove 126 in the embodiment) is provided in an area on a joining surface between the rim portion and the annular member where the rib is projected in a radial direction.

An axial gap motor according to a seventh aspect of the invention is an axial gap motor as set forth in the sixth aspect of the invention, wherein the relief portion is provided along a full circumference of the rotor.

An axial gap motor according to an eighth aspect of the invention is an axial gap motor as set forth in the sixth aspect of the invention, wherein the annular member is made of a non magnetic material.

According the axial gap motor according to the sixth aspect of the invention, since the rotor includes the annular member which is press fitted on the outer circumferential portion of the rim portion of the rotor frame and the relief groove is provided in the area on the joining surface between the annular member and the rim portion where the rib is projected in the radial direction, the variation in stress distribution in the rotor frame can be reduced, thereby making it possible to reduce the press fitting load.

According to the axial gap motor according to the seventh aspect of the invention, since the relief groove is formed along the full circumference of the rotor, the necessity is obviated of matching circumferentially the phase of the relief portion with the phase of the ribs where stress is increased, thereby making it possible to improve the assembling properties of the motor.

According to the axial gap motor according to the eighth aspect of the invention, since the annular member is made up of the non magnetic material, the short circuit of magnetic flux through the annular member can be prevented. By this, a reduction in generated torque of the motor and a reduction in efficiency can be prevented.

Other features and advantages may be apparent from the following detailed description, the accompanying drawings and the claims.

BRIEF DESCRIPTION OF THE DRAWINGS

FIG. 7 is an exploded perspective view which depicts an axial gap motor according to a fifth embodiment.

DETAILED DESCRIPTION

Figure 1:
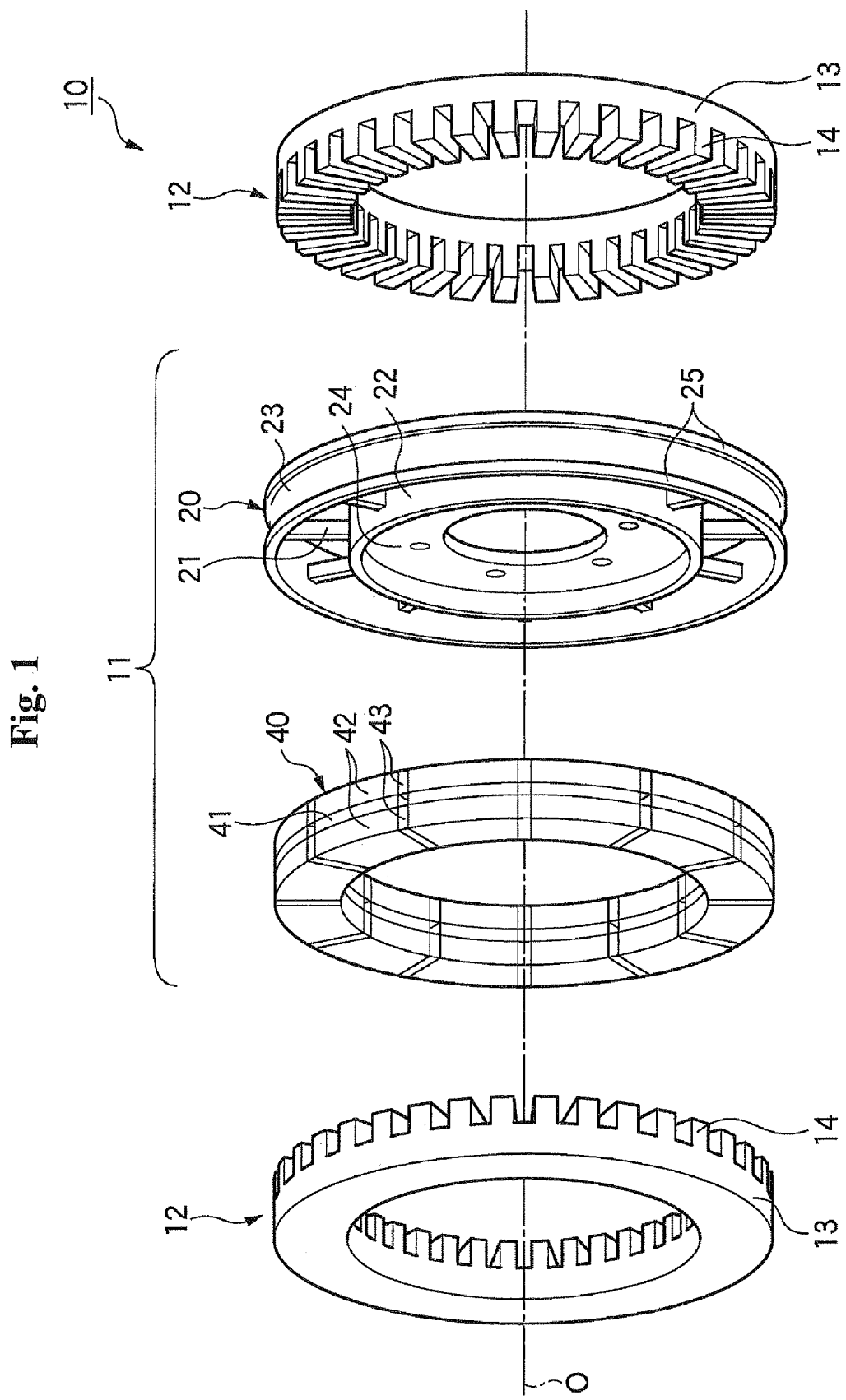
FIG. 1 is an exploded perspective view which depicts a first embodiment of an axial gap motor according to the invention.

Hereinafter, embodiments of axial gap motors according to the invention will be described in detail based on the accompanying drawings. Note that the drawings are to be seen in a direction in which reference numerals are oriented properly for reading.

First Embodiment

Firstly, referring to FIGS. 1 to 3B, a first embodiment of an axial gap motor according to the invention will be described.

As is shown in FIG. 1, an axial gap motor 10 of this embodiment includes a substantially annular rotor 11 which is provided in such a manner as to rotate about a rotational axis O of the axial gap motor 10 and a pair of stators 12 which are disposed to confront the rotor 11 in such a manner as to hold therebetween the rotor 11 from both sides in an axial direction of the rotational axis O (hereinafter, referred to simply as an axial direction) and which have stator windings of a plurality of phases which generate a rotational magnetic field which rotates the rotor 11.

The axial gap motor 10 is installed in a vehicle such as a hybrid vehicle or an electric vehicle as a drive source, and a driving force of the axial gap motor 10 is made to be transmitted to drive road wheels (whose illustration is omitted) of the vehicle via a transmission (whose illustration is omitted) by an output shaft of the axial gap motor 10 being connected to an input shaft of the transmission.

In addition, when the driving force is transmitted to the axial gap motor 10 from the drive road wheels side when the brakes are applied to the vehicle, the axial gap motor 10 functions as a generator so as to generate a so-called regenerative braking force, whereby kinetic energy of a vehicle body is recovered as electric energy (regenerative energy). Further, for example, in a hybrid vehicle, when a crankshaft of an internal combustion engine (whose illustration is omitted) is connected to the rotor 11 of the axial gap motor 10, an output of the internal combustion engine is transmitted to the axial gap motor 10, and the axial gap motor 10 functions as a generator so as to generate electricity generating energy.

The stator 12 includes a substantially annular plate-shaped yoke portion 13, a plurality of teeth 14, . . . , 14 which project from positions lying at predetermined intervals in a circumferential direction on a confronting surface of the yoke portion 13 which confronts the rotor 11 towards the rotor 11 along the axial direction, while extending in a radial direction, and stator windings (whose illustration is omitted) which are mounted between appropriate teeth 14, 14.

The stator 12 is of a 6N type, for example, in which six main poles (for example, $U^+$, $V^+$, $W^+$, $U^-$, $V^-$, $W^-$) are provided, and the respective $U^-$, $V^-$, $W^-$ poles of the other stator 12 are set in such a manner as to confront the respective $U^+$, $V^+$, $W^+$ poles of the one stator 12. For example, in the pair of stators 12, 12 which confront each other in the axial direction, three teeth 14, 14, 14 of the one stator 12 which confront one of the $U^+$, $V^+$, $W^+$ poles and $U^-$, $V^-$, $W^-$ poles and three teeth 14, 14, 14 of the other stator 12 which confront the other of the $U^+$, $V^+$, $W^+$ poles and $U^-$, $V^-$, $W^-$ poles are set in such a manner as to confront each other in the axial direction, and the energized states of the teeth 14 of the one stator 12 and the teeth 14 of the other stator 12 which confront each other in the axial direction are set in such a manner as to be inverted in terms of electrical angle.

Figure 2:
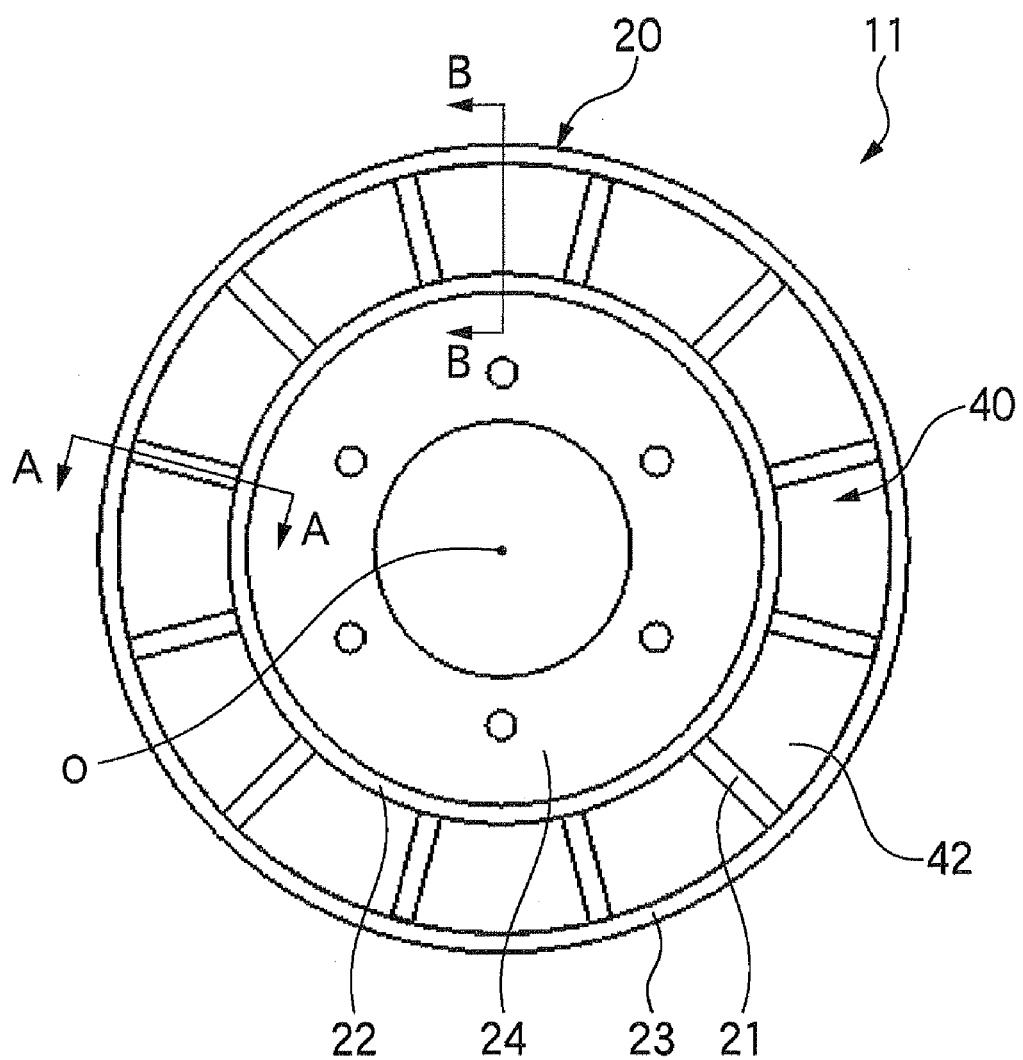
FIG. 2 is a front view of a rotor shown in FIG. 1.

As is shown in FIGS. 1 and 2, the rotor 11 includes a rotor frame 20 and a plurality of magnet pole portions 40, . . . , 40 and a plurality of sub-magnet portions 43, . . . , 43 which are accommodated within the rotor frame 20 in such a state that the magnet pole portions and the sub-magnet portions are disposed alternately.

Figure 3A:
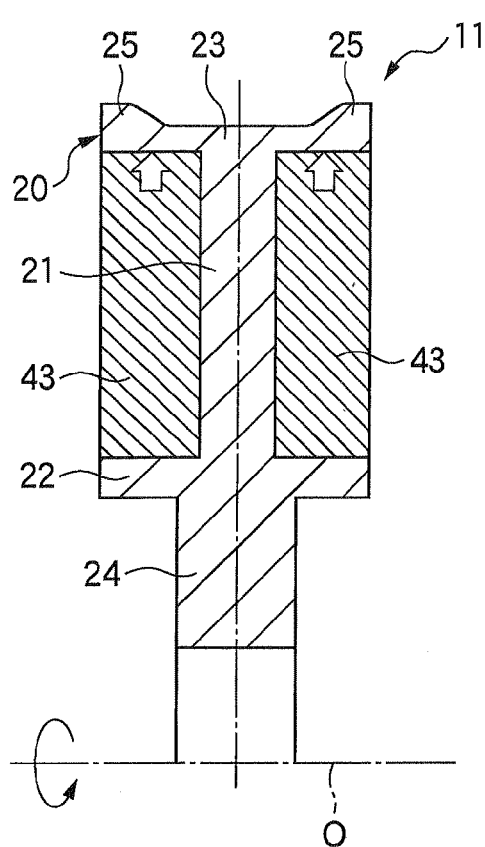
FIG. 3A is a sectional view of a main part of the rotor shown in FIG. 2, which is a sectional view taken along the line A-A and as viewed in a direction indicated by arrows attached to the line in FIG. 2.
Figure 3B:
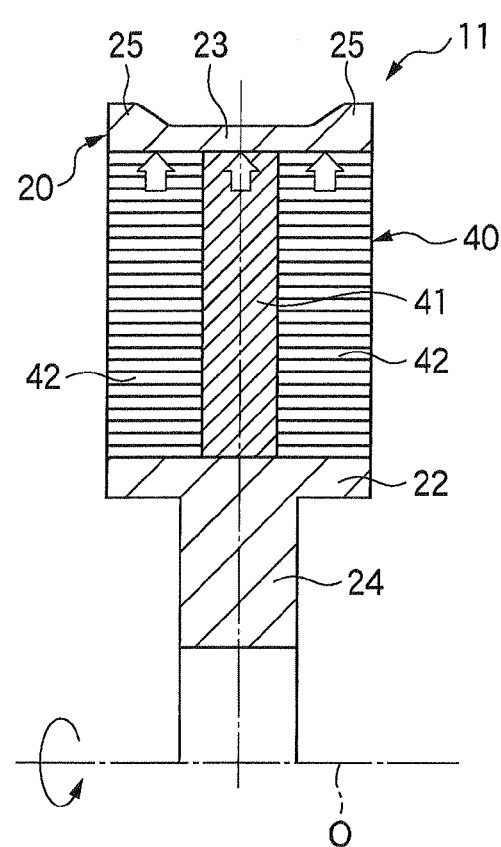
FIG. 3B is a sectional view of a main part of the rotor shown in FIG. 2, which is a sectional view taken along the line B-B and as viewed in a direction indicated by arrows attached to the line in FIG. 2.

The rotor frame 20 is formed of a non magnetic material such as stainless steel or aluminum and includes, as is shown in FIGS. 1 and 3A, 3B, a plurality of ribs 21, . . . , 21 which are disposed at predetermined intervals in the circumferential direction and which extend in the radial direction, a shaft portion 22 and a rim portion 23 which are connected together by the plurality of ribs 21, and an annular plate-shaped connecting portion 24 which extends radially inwards from an axial center of an inner circumferential surface of the shaft portion 22 for connection to an exterior drive shaft (for example, the input shaft of the transmission of the vehicle or the like). In addition, in this embodiment, the rib 21 is formed into a prism shape whose axial width and circumferential width are constant.

The magnet pole portion 40 is made up of a substantially segmental main magnet portion 41 which is magnetized in a thickness direction (that is, in the axial direction) and a pair of magnetic members 42 which hold therebetween the main magnet portion 41 from both sides thereof in the thickness direction. The magnet pole portions 40 are accommodated within the rotor frame 20 in such a state that the magnet pole portions 40 are held from both sides thereof in the radial direction by the shaft portion 22 and the rim portion 23 and that the main magnet portions 41 are each held from both sides thereof in the circumferential direction by the ribs 21 which lie adjacent to each other in the circumferential direction. In addition, the main magnet portions 41, 41 which lie adjacent to each other in the circumferential direction are set in such a manner that the magnetized directions thereof become different from each other. Additionally, the magnetic member 42 may be made up of a plurality of stacked electromagnetic steel plates or can be manufactured by molding and sintering powder such as iron powder.

The sub-magnet portion 43 is a magnet with a substantially rectangular cross section which is magnetized in a direction which is orthogonal to the axial direction and the radial direction (that is, a substantially circumferential direction). The sub-magnet portions 43 are accommodated within the rotor frame 20 in such a state that the sub-magnet portions 43 are held from both sides in the radial direction by the shaft portion 22 and the rim portion 23 and are positioned on both sides of the ribs 21 in the axial direction (in other words, on both sides of the magnetic members 42 in the circumferential direction).

In addition, in this embodiment, as is shown in FIGS. 3A, 3B, thick rigid portions 25 are formed in areas where the sub-magnet portions 43 are projected in the radial direction relative to an area where the rib 21 is projected in the radial direction in an axial cross section of the rim portion, that is, at both axial end portions on an outer circumference of the rim portion 23. Note that arrows in FIG. 3 represent centrifugal force which acts on the rim portion 23.

Thus, as has been described heretofore, according to the axial gap motor 10 of this embodiment, since the rigid portions 25 are formed in the areas where the sub-magnet portions 43 are projected in the radial direction relative to the area where the rib 21 is projected in the radial direction in the axial cross section of the rim portion 23, the rigidity of the rim portion 23 of the rotor frame 20 can be increased. By this, the deformation of the rim portion 23 due to centrifugal force generated when the rotor 11 rotates at high speeds can be suppressed to a minimum level. In addition, since the deformation of the rim portion 23 is suppressed to the minimum level, the main magnet portions 41, the sub-magnet portions 43 and the magnetic members 42 can be prevented from getting unfastened axially outwards.

In addition, according to the axial gap motor 10 of this embodiment, since the rotor frame 20 (the rigid portions 25) is made of the non magnetic material, the short circuit of magnetic flux through the rotor frame 20 can be prevented. By this, a reduction in generated torque of the motor 10 and a reduction in efficiency can be prevented.

Second Embodiment

Next, referring to FIGS. 4A, 4B, a second embodiment of an axial gap motor according to the invention will be described. The axial gap motor of this embodiment is the same as the axial gap motor of the first embodiment except that an annular member is provided on an outer circumferential surface of a rim portion. Therefore, like reference numerals or corresponding reference numerals will be given to like portions to those of the first embodiment, and the description thereof will be simplified or omitted.

Figure 4A:
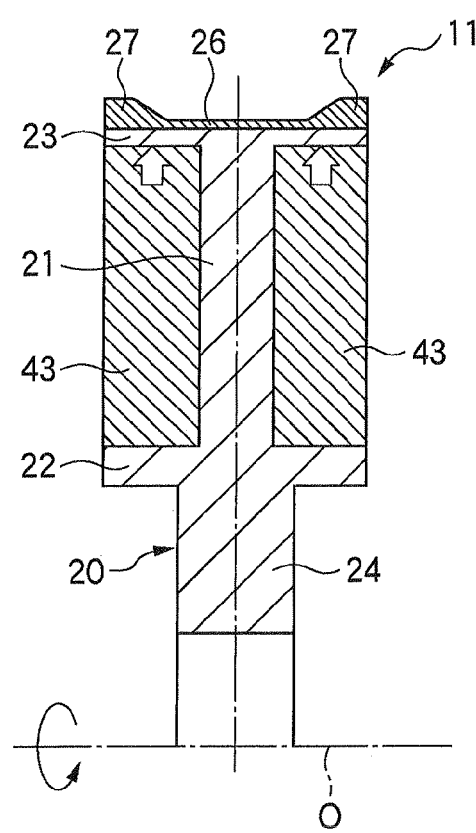
FIG. 4A is a sectional view of a main part of a rotor of a second embodiment, which is a sectional view taken along the line which corresponds to the line A-A in FIG. 2.
Figure 4B:
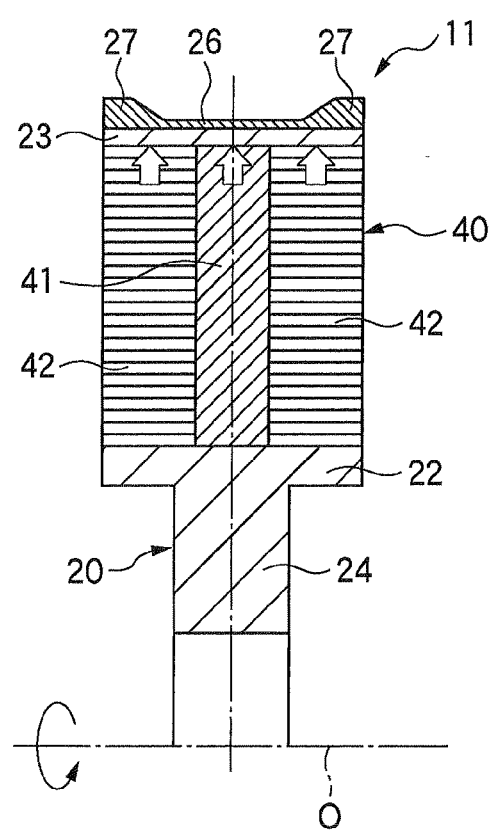
FIG. 4B is a sectional view of a main part of the rotor of the second embodiment, which is a sectional view taken along the line which corresponds to the line B-B in FIG. 2.

A rotor frame 20 of this embodiment is, as is shown in FIGS. 4A, 4b, such that the thickness of a rim portion 23 is constant in an axial direction and an annular member 26 made of a non magnetic material is secured to an outer circumferential surface of the rim portion 23 through press fit or shrink fit. This annular member 26 has substantially the same axial width as that of the rim portion 23, and in a cross section of the rim portion 23 in a rotational axis direction, thick rigid portions 27 are formed in areas where sub-magnet portions 43 are projected in a radial direction relative to an area where a rib 21 is projected in the radial direction, that is, at both axial end portions on an outer circumference of the annular member 26. Note that arrows in FIGS. 4A, 4B represent centrifugal force acting on the rim portion 23 and the annular member 26.

Thus, as has been described heretofore, according to the axial gap motor 10 according to this embodiment, since the rigid portions 27 are provided by attaching the annular member 26 to the outer circumference of the rim portion 23, in the even that the annular member 26 is molded by the use of a material having a high tensile strength, a rotor frame 20 can be formed by a material which has a relatively low strength or inexpensive, thereby making it possible to reduce the manufacturing costs of a rotor 11. In addition, since the annular member 26 has a simple shape which is easy to be worked, the productivity becomes high, the manufacturing costs can be reduced and the deformation of the rim portion 23 can effectively be suppressed.

In addition, according to the axial gap motor 10 of this embodiment, since the annular member 26 (the rigid portions 27) is made of a non magnetic material, the short circuit of magnetic flux through the annular member 26 can be prevented. By this, a reduction in generated torque of the motor 10 and a reduction in efficiency can be prevented.

Additionally, according to the axial gap motor 10 of this embodiment, since the annular member 26 is secured to the outer circumferential surface of the rim portion 23 through press fit or shrink fit, compression stress is exerted on the rim portion 23 at all times. Because of this, when the rotor 11 rotates and tensile stress due to centrifugal force generated by the rotation of the rotor 11 acts on the rim portion 23, the tensile stress and compression stress are offset by each other, thereby making it possible to reduce stress acting on the rim portion 23.

The other configurations, functions and advantages are the same as those of the first embodiment.

Third Embodiment

Next, referring to FIGS. 5A, 5B, a third embodiment of an axial gap motor according to the invention will be described. Note that the this embodiment is the same as the axial gap motor of the first embodiment except that magnetic members and sub-magnetic portions are held by tapered surfaces from both sides in a radial direction, and therefore, like reference numerals or corresponding reference numerals will be given to like portions to those of the first embodiment, so that the description thereof will be simplified or omitted.

Figure 5A:
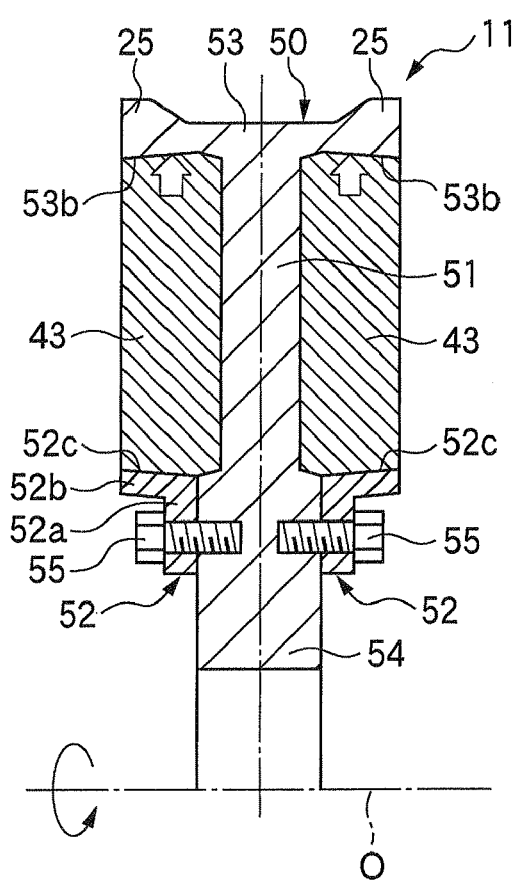
FIG. 5A is a sectional view of a main part of a rotor of a third embodiment, which is a sectional view taken along the line which corresponds to the line A-A in FIG. 2.
Figure 5B:
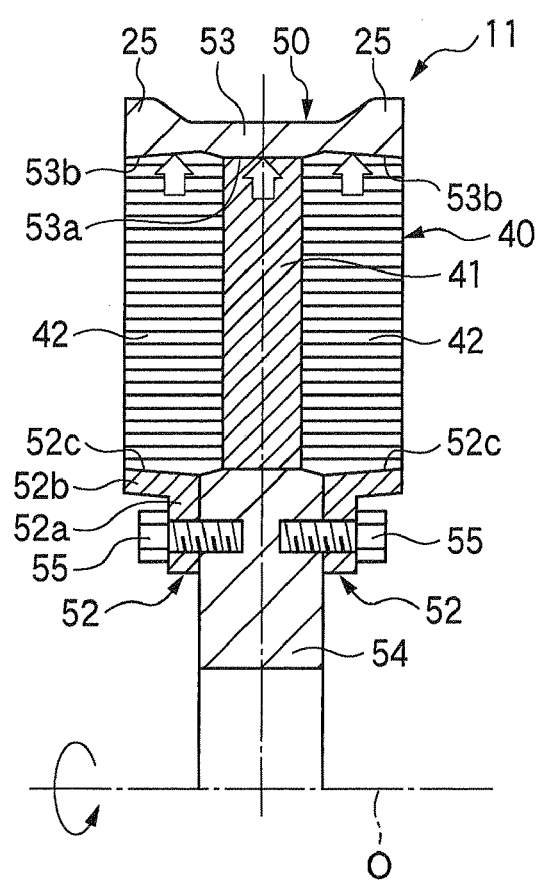
FIG. 5B is a sectional view of a main part of the rotor according to the third embodiment, which is a sectional view taken along the line which corresponds to the line B-B in FIG. 2.

A rotor frame 50 of this embodiment is formed of a non magnetic material such as stainless steel or aluminum and includes, as is shown in FIGS. 5A, 5B, a plurality of ribs 51, . . . , 51, a rim portion 53 an annular plate-shaped connecting portion 54 which are connected together by the plurality of ribs 51, and ring members 52, 52 which are disposed on both axial sides of the connecting portion 54.

The ring member 52 is an annular member with a substantially L-shaped cross section, has an annular portion 52a and a collar portion 52b which extends axially outwards from a radially outer end portion of the annular portion 52a and is fastened to an axial lateral surface of the connecting portion 54 with bolts 55.

In addition, in this embodiment, as is shown in FIGS. 5A, 5B, in an axial cross section of the rim portion 53, thick rigid portions 25 are formed in regions where sub-magnet portions 43 are projected in a radial direction relative to an area where the rib 51 is projected in the radial direction, that is, at both axial end portions on an outer circumference of the rim portion 53. Note that arrows in FIG. 5 represent centrifugal force acting on the rim portion 53.

In addition, in this embodiment, an inner circumferential surface of the rim portion 53 has a flat plane-like inner surface 53a which is formed axially centrally and is parallel to a rotational axis O and tapered inner surfaces 53b which are formed at both axial sides of the flat plane-like inner surface 53a and are inclined in such a manner as to reduce gradually an inside diameter of the rim portion 53 as they extend axially outwards from an axial center of the rim portion 53. In addition, an outer circumferential surface of the collar portion 52b of the ring member 52 has a tapered outer surface 52c which is inclined in such a manner as to increase gradually an outside diameter of the ring member 52 as it extends axially outwards from the annular portion 52a side. By this configuration, the tapered inner surfaces 53b of the rim portion 53 and the tapered outer surfaces 52c of the ring members 52 are disposed in such a manner as to confront each other in the radial direction.

In addition, in this embodiment, outer circumferential surfaces of magnetic members 42 and sub-magnet portions 43 are formed at the same inclination angle as that of the tapered inner surfaces 53b of the rim portion 53, and inner circumferential surfaces of the magnetic members 42 and the sub-magnet portions 43 are formed at the same inclination angle as that of the tapered outer surfaces 52c of the ring members 52. By this configuration, the magnetic members 42 and the sub-magnet portions 43 are held by the tapered inner surfaces 53b of the rim portion 53 and the tapered outer surfaces 52c of the ring members 52 in such a manner as to be embraced from both sides thereof in the radial direction.

Thus, as has been described heretofore, according to the axial gap motor 10 of this embodiment, since the inner circumferential surface of the rim portion 53 has the tapered inner surfaces 53b which are inclined in such a manner as to reduce gradually the inside diameter of the rim portion 53 as they extend axially outwards from the axial center of the rim portion 53, even in the event that axial end portions of the rim portion 53 are deformed in such a manner as to be opened radially outwards, since main magnet portions 41, the sub-magnet portions 43 and the magnetic members 42 are in engagement with the tapered inner surfaces 53b, the main magnet portions 41, the sub-magnet portions 43 and the magnetic members 42 can be prevented from being offset axially outwards.

The other configurations, functions and advantages of this embodiment are the same as those of the first embodiment.

Fourth Embodiment

Next, referring to FIGS. 6A, 6B, a fourth embodiment of an axial gap motor according to the invention will be described. Note that the axial gap motor of this embodiment is the same as the axial gap motors of the first to third embodiments except that the annular member of the second embodiment is provided on the outer circumferential surface of the rim portion of the rotor frame of the third embodiment, and therefore, like reference numerals or corresponding reference numerals will be given to like portions to those of the first to third embodiments, so that the description thereof will be simplified or omitted.

Figure 6A:
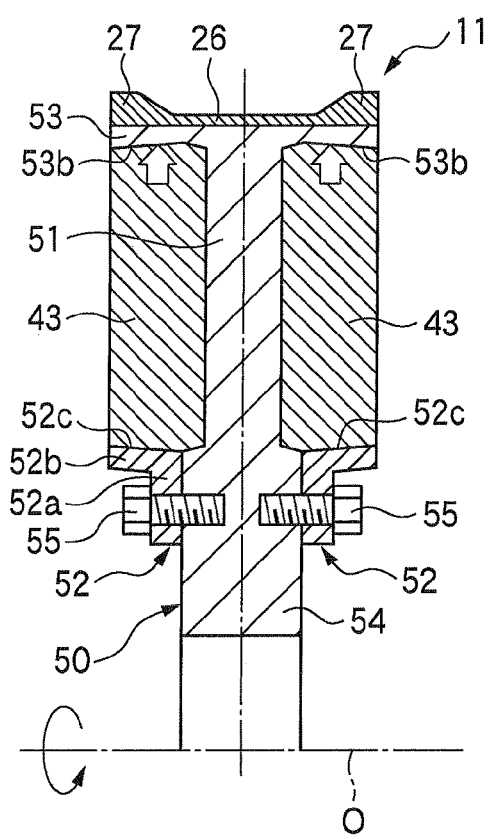
FIG. 6A is a sectional view of a main part of a rotor of a fourth embodiment, which is a sectional view taken along the line which corresponds to the line A-A in FIG. 2.
Figure 6B:
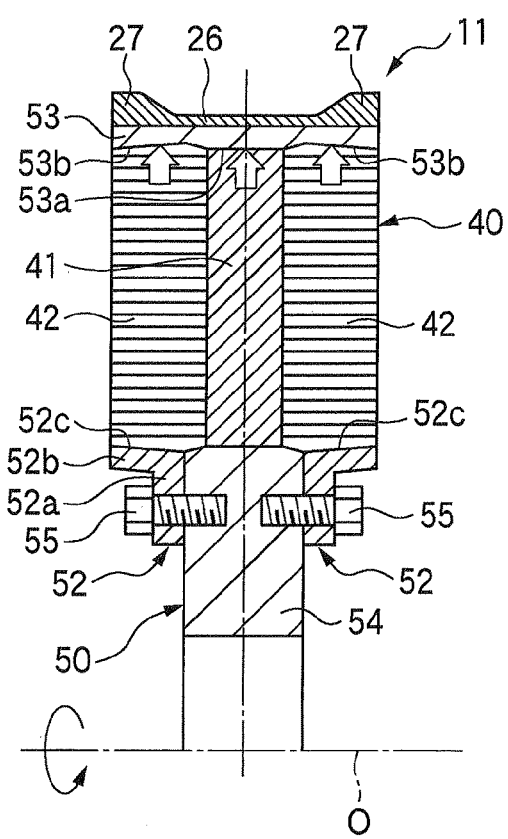
FIG. 6B is a sectional view of a main part of the rotor of the fourth embodiment, which is a sectional view taken along the line which corresponds to the line B-B in FIG. 2.

As is shown in FIGS. 6A, 6B, a rotor frame 50 of this embodiment is such that an outer circumferential surface of a rim portion 53 is formed level and an annular member 26 made of a non magnetic material is secured to the outer circumferential surface of the rim portion 53 through press fit or shrink fit.

The other configurations, functions and advantages of this embodiment are the same as those of the first to third embodiments.

Fifth Embodiment

Next, referring to FIGS. 7 to 8B, a fifth embodiment of an axial gap motor according to the invention will be described. Note that the axial gap motor of this embodiment is the same as the axial gap motor of the first embodiment except that no sub-magnet portions are provided and that an axial width of ribs of a rotor frame is made substantially the same as that of a rim portion, and therefore, like reference numerals or corresponding reference numerals will be given to like portions to those of the first to third embodiments, so that the description thereof will be simplified or omitted.

Figure 8A:
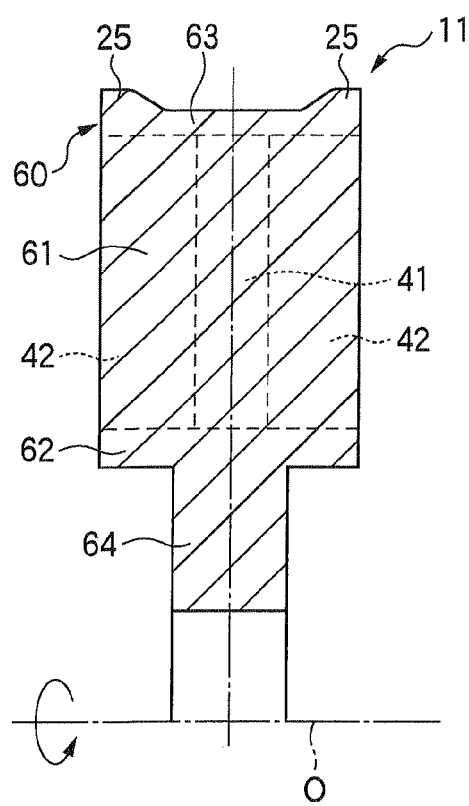
FIG. 8A is a sectional view of a rotor shown in FIG. 7, which is a sectional view taken along the line which corresponds to the line A-A in FIG. 2.
Figure 8B:
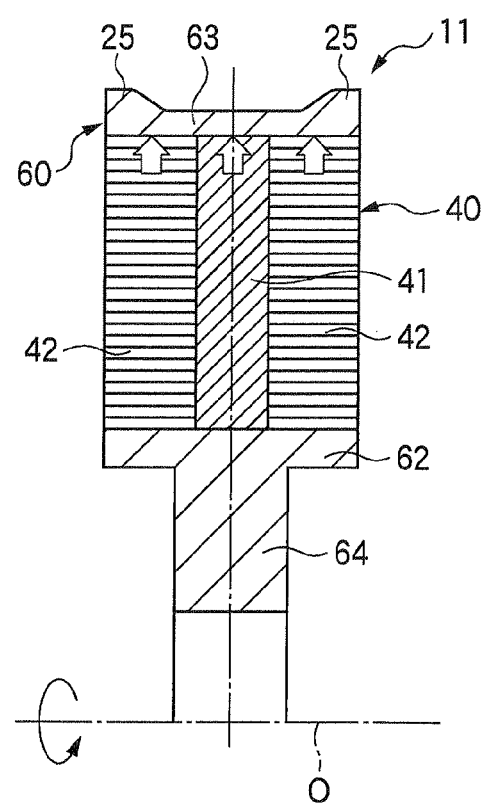
FIG. 8B is a sectional view of the rotor shown in FIG. 7, which is a sectional view taken along the line which corresponds to the line B-B in FIG. 2.

As is shown in FIGS. 7 to 8B, a rotor 11 of this embodiment includes a rotor frame 60 and a plurality of magnet pole portions 40, . . . , 40 which are accommodated within the rotor frame 60 in such a state that they are disposed in a circumferential direction.

The rotor frame 60 is made of a non magnetic material such as stainless steel or aluminum and includes, as is shown in FIGS. 7 to 8B, a plurality of ribs 61, . . . , 61 which are disposed at predetermined intervals in the circumferential direction and which extend in a radial direction, a shaft portion 62 and a rim portion 63 which are connected together by the plurality of ribs 61 and an annular plate-like connecting portion 64 which extends radially inwards from an axial center of an inner circumferential surface of the shaft portion 62. In addition, in this embodiment, the ribs 61 are each formed into a plate-like shape whose axial width is substantially the same as that of the rim portion 63 and whose circumferential width is constant.

In addition, in this embodiment, as is shown in FIGS. 8A, 8B, in an axial cross section of the rim portion 63, thick rigid portions 25 are formed in areas where magnetic members 42 are projected in a radial direction relative to an area a main magnet portion 41 is projected in the radial direction, that is, at both axial end portions on an outer circumference of the rim portion 63. Note that arrows in FIGS. 8A, 8B represent centrifugal force which acts on the rim portion 63.

Thus, as has been described above, according to the axial gap motor 10 of this embodiment, since the rigid portions 25 are formed in the areas where the magnetic members 42 are projected in the radial direction relative to the area where the main magnet portion 41 is projected in the radial direction in the axial cross section of the rim portion 63, the rigidity of the rim portion 63 of the rotor frame 60 can be increased. By this, the deformation of the rim portion 63 due to centrifugal force generated when the rotor 11 rotates at high speeds can be suppressed to a minimum level. In addition, since the deformation of the rim portion 63 can be suppressed to the minimum level, the main magnet portions 41 and the magnetic members 41 can be prevented from getting unfastened axially outwards.

The other configurations, functions and advantages of this embodiment are the same as those of the first embodiment.

As a modified example to this embodiment, as in the case of the second embodiment shown in FIGS. 4A, 4B, the thickness of the rim portion 63 is made constant in the axial direction, and annular member 26 may be made to be secured to an outer circumferential surface of the rim portion 63. In addition, as in the case of the third embodiment shown in FIGS. 5A, 5B, tapered inner surfaces 53b are provided on an inner circumferential surface of the rim portion 63, so that the magnet pole portions 40 may be made to be held in such a manner as to be embraced from both radial sides thereof by the tapered inner surfaces 53b so provided in cooperation with tapered outer surfaces 52c of separate ring members 52. In addition, as in the case of the fourth embodiment shown in FIGS. 6A, 6B, the second embodiment and the third embodiment may be combined together.

Sixth Embodiment

Next, referring to FIGS. 9 to 11, a sixth embodiment of an axial gap motor according to the invention will be described. The axial gap motor of this embodiment is the same as the axial gap motor of the first embodiment except that an outer circumferential surface of a rim portion is formed level and an annular member is provided on the outer circumferential surface of the rim portion. Therefore, like reference numerals or corresponding reference numerals will be given to like portions to those of the first embodiment, and the description thereof will be simplified or omitted.

Figure 9:
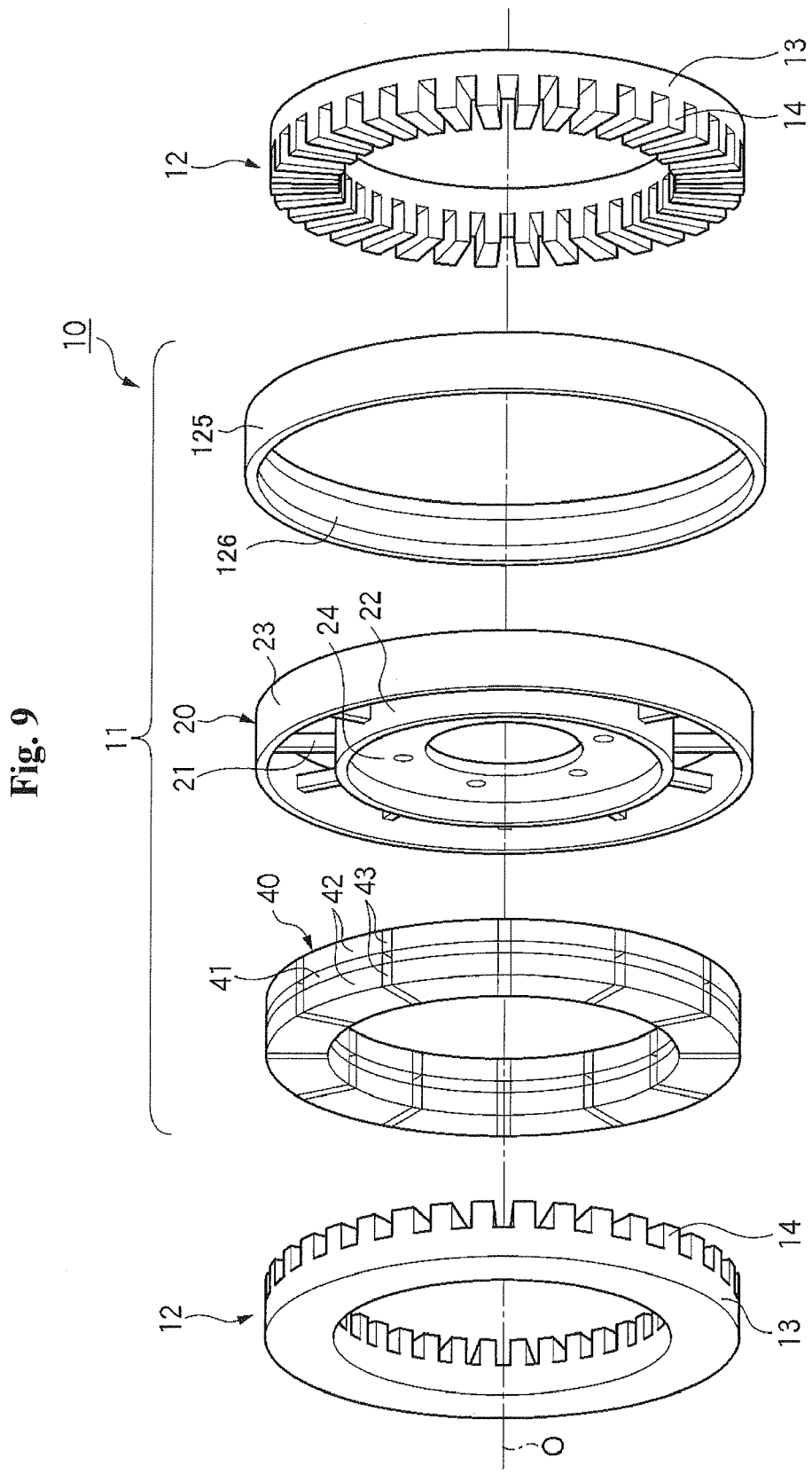
FIG. 9 is an exploded perspective view which depicts a sixth embodiment of an axial gap motor according to the invention.
Figure 10:
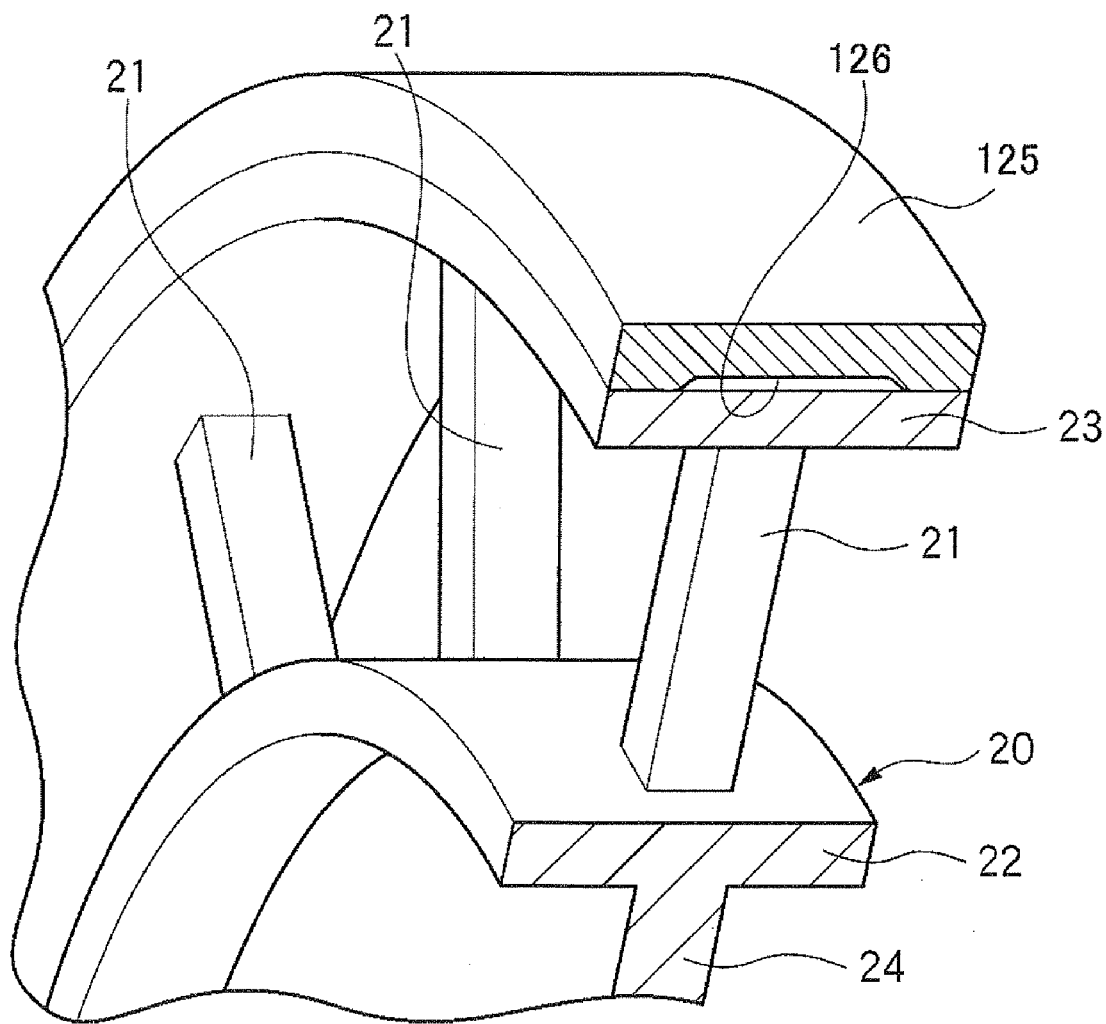
FIG. 10 is an enlarged partially sectional perspective view showing a main part of a rotor frame on which an annular member shown in FIG. 9 is press fitted.
Figure 11:
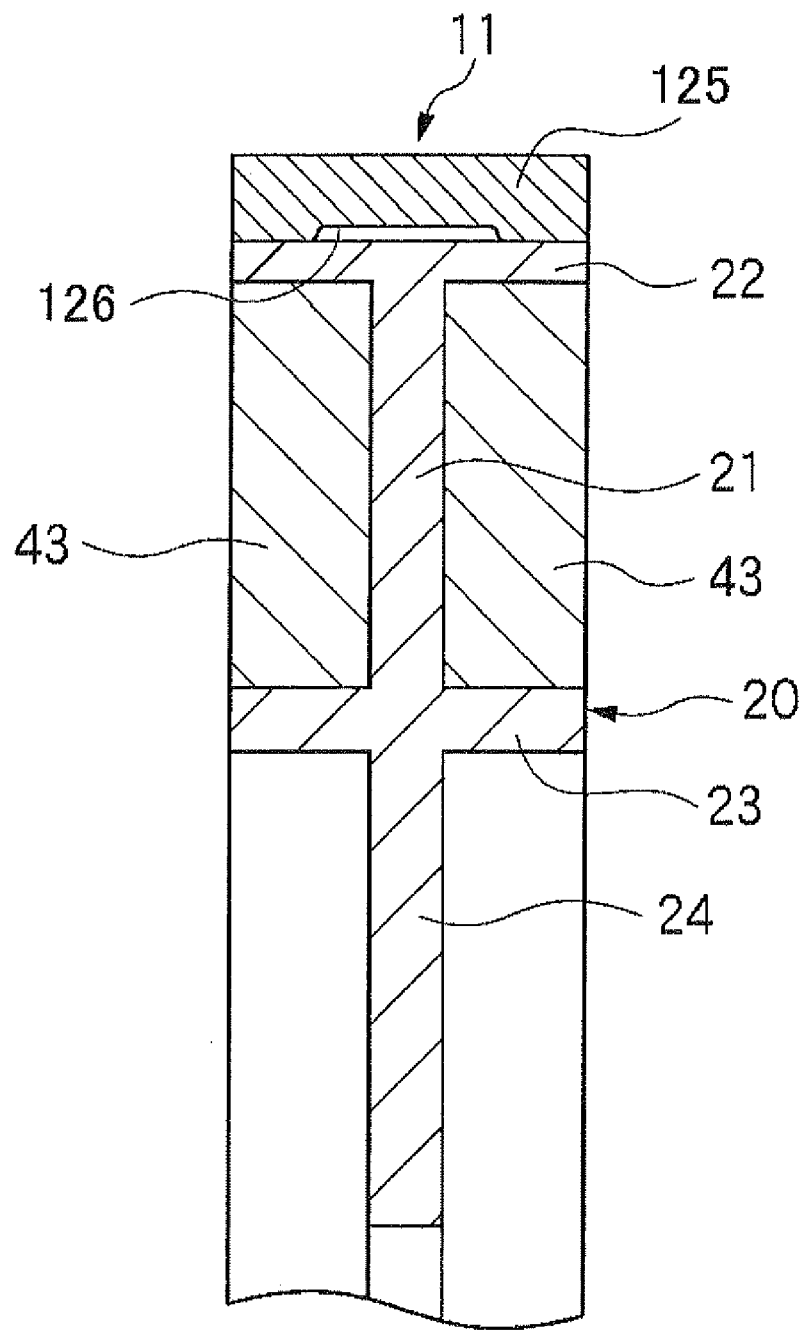
FIG. 11 is an enlarged sectional view of a main part of a rotor shown in FIG. 9.

In this embodiment, as is shown in FIGS. 9 to 11, an annular member 125 made of a non magnetic material is secured to an outer circumferential portion of the rim portion 23 of the rotor frame 20 through press fit. This annular member 125 has substantially the same axial width as that of the rim portion 23, and a recessed relief groove (a relief portion) 126 is formed in an area on a joining surface between the rim portion 23 and the annular member 125 where the ribs 21 are projected in the radial direction, that is, at an axially central portion on an inner circumferential surface of the annular member 125 in such a manner as to extend along a full circumference of the annular member 125. Note that while in this embodiment, the relief groove 126 is formed on the inner circumferential surface of the annular member 125, the relief groove 126 may be formed at an axially central portion on an outer circumferential surface of the rim portion 23 in such a manner as to extend along a full circumference of the rim portion 23.

Figure 12:
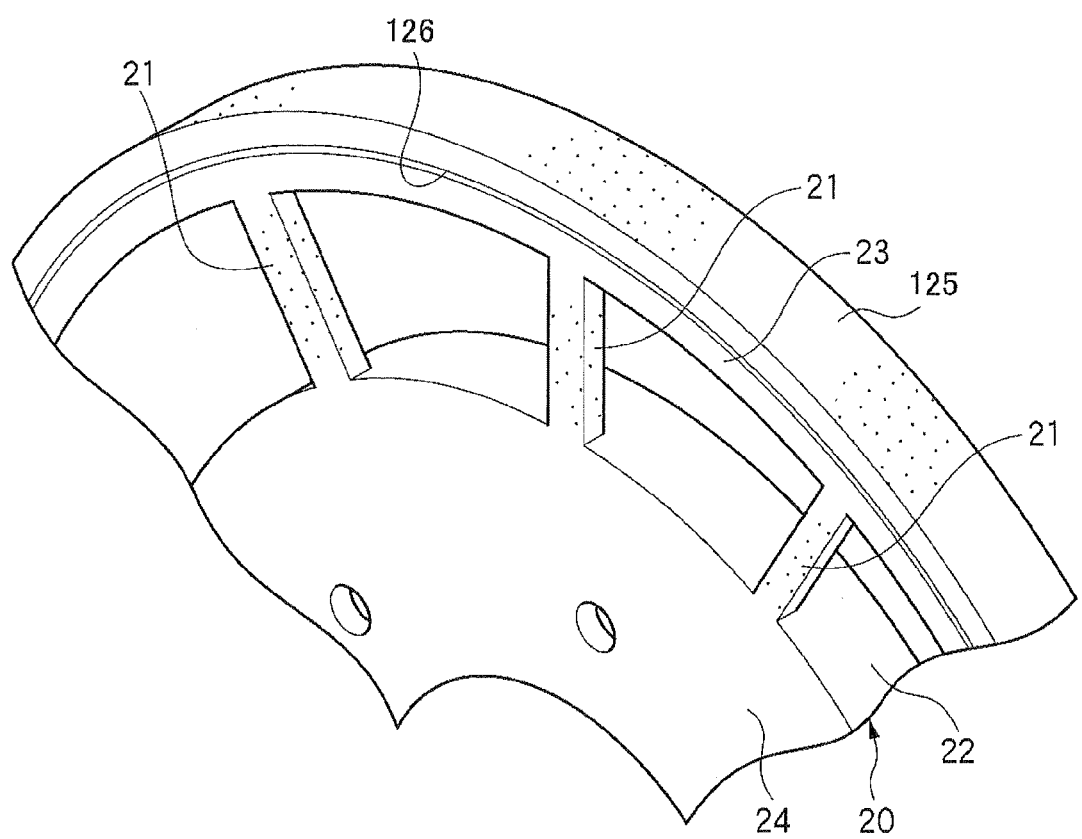
FIG. 12 is a drawing which explains stress generated in the rotor frame and the annular member shown in FIG. 10, which is an enlarged perspective view of the main parts which are cut along an axial center thereof.
Figure 13:
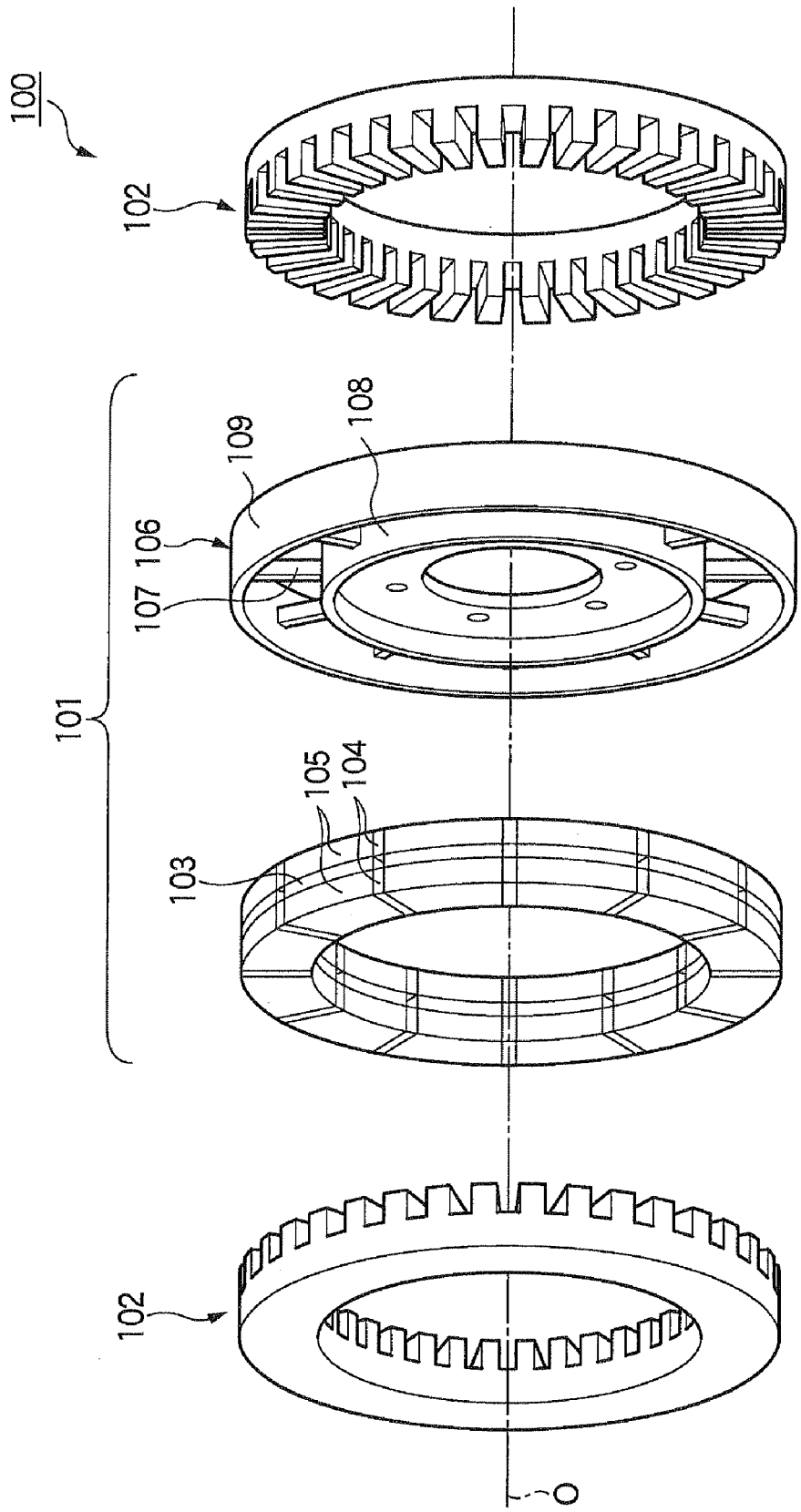
FIG. 13 is an exploded perspective view which depicts a related-art axial gap motor.
Figure 14A:
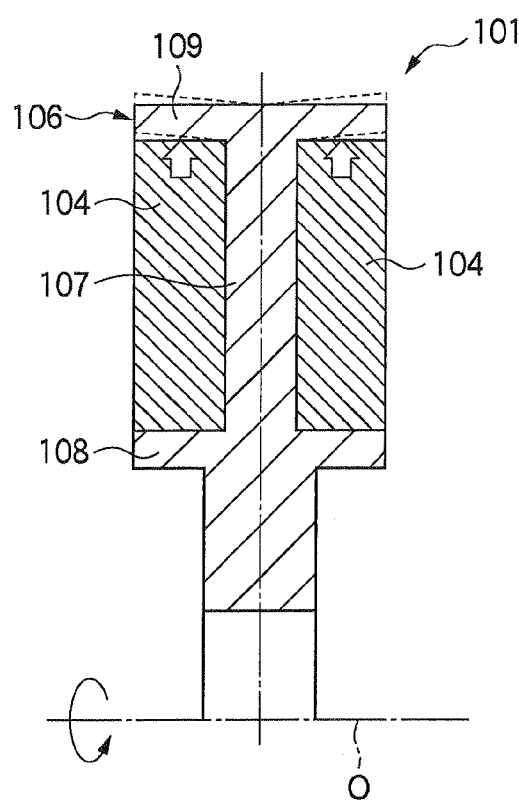
FIG. 14A is a sectional view of a main part of a rotor shown in FIG. 13, which is a sectional view taken along the line which corresponds to the line A-A in FIG. 2.
Figure 14B:
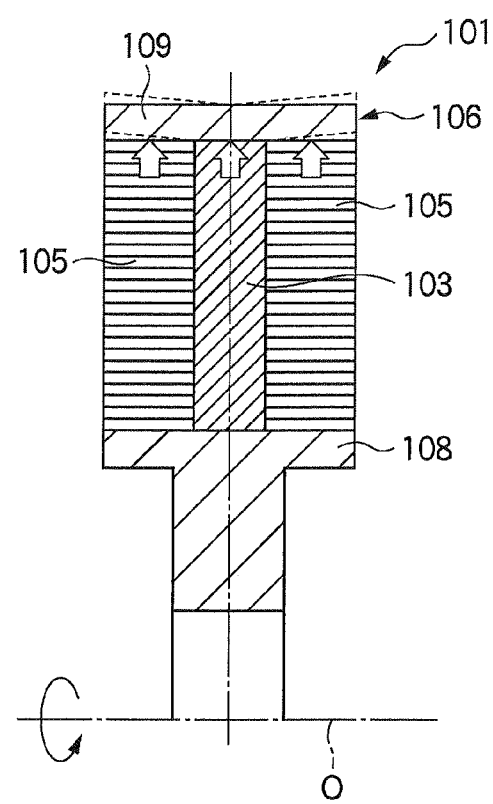
FIG. 14B is a sectional view of a main part of the rotor shown in FIG. 13, which is a sectional view taken along the line which corresponds to the line B-B in FIG. 2.
Figure 15:
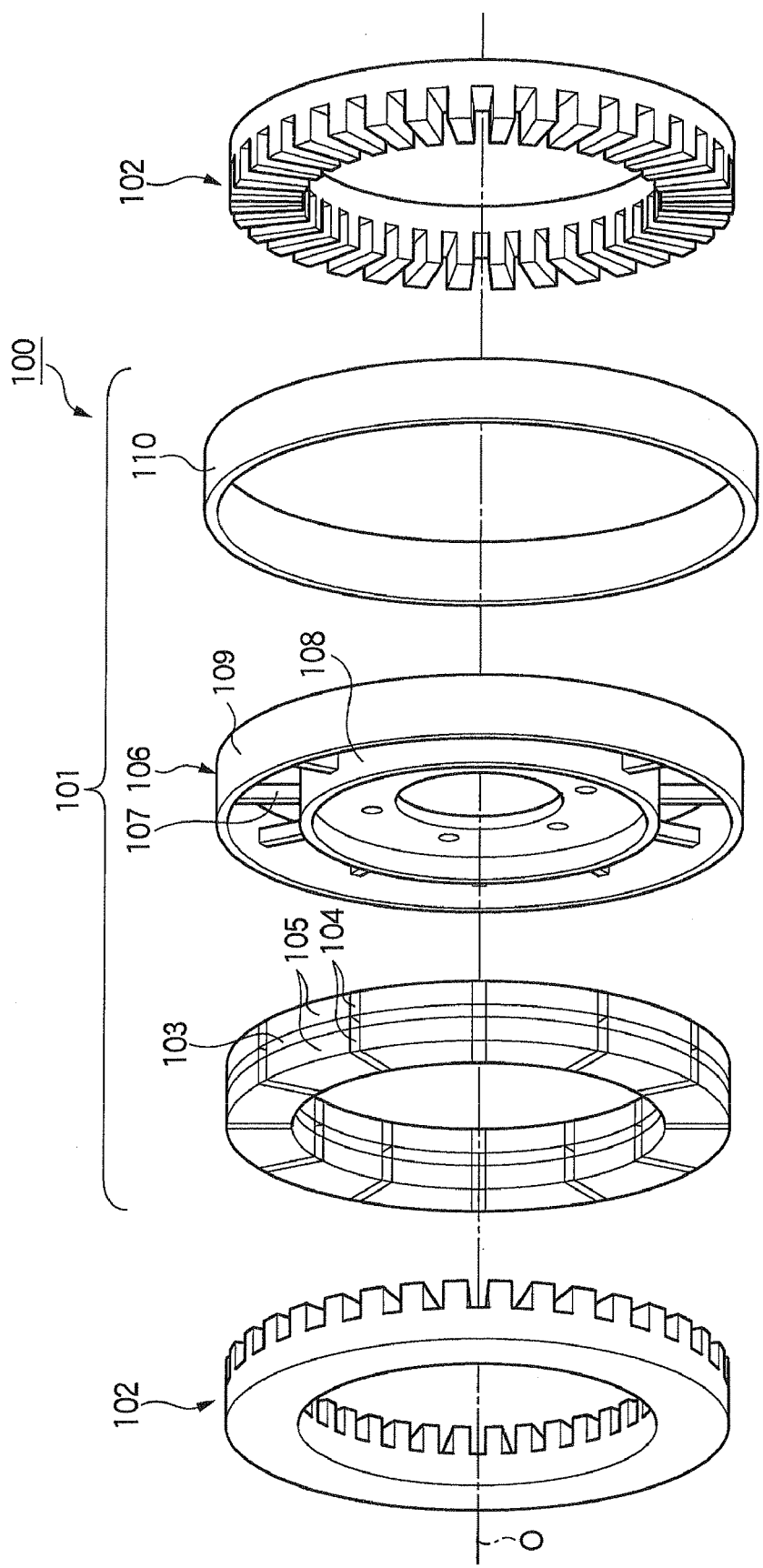
FIG. 15 is an exploded perspective view which depicts another related-art axial gap motor.
Figure 16:
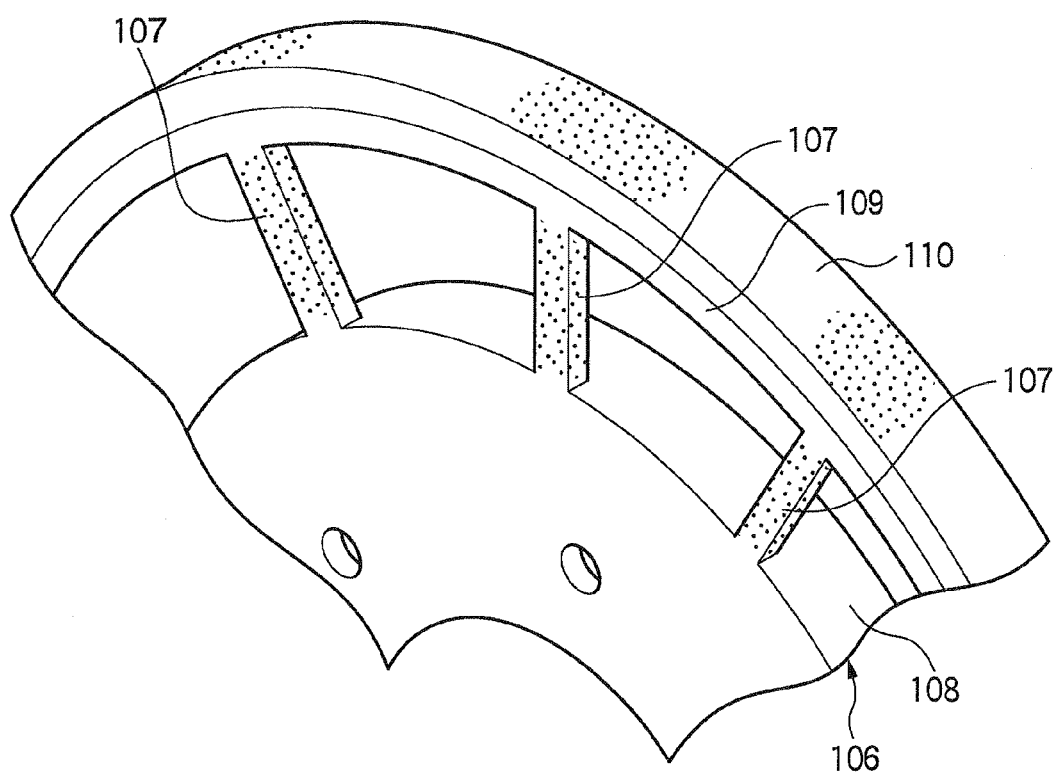
FIG. 16 is a diagram which explains stress generated in a rotor frame and an annular member shown in FIG. 15, which is an enlarged perspective view of the main parts which are cut along an axial center thereof.

In the axial gap motor 10 that is configured as has been described above, as is shown in FIG. 12, compared with a case where no relief groove 126 is formed, stress is reduced that is generated in the ribs 21 and positions on the rim portion 23 which lie in the vicinity of connecting portions with the ribs 21 (dotted portions in FIG. 12) after the annular member 125 has been press fitted. By this, the variation in stress distribution in the rotor frame 20 is reduced. In addition, since the stress generated in the rotor frame 20 is reduced, the press fitting load of the annular member 125 is also reduced.

Thus, as has been described heretofore, according to the axial gap motor 10 of this embodiment, since the annular member 125 is provided which is press fitted on the outer circumferential portion of the rim portion 23 of the rotor frame 20 and the relief groove 126 is formed in the area on the joining surface between the annular member 125 and the rim portion 23 where the ribs 21 are projected in the radial direction, the stress can be reduced that is generated in the ribs 21 and positions on the rim portion 23 which lie in the vicinity of the connecting portions with the ribs 21 after the annular member 125 has been press fitted. By this, the variation in stress distribution in the rotor frame 20 can be reduced.

In addition, since the stress generated in the rotor frame 20 is reduced, the press fitting load of the annular member 125 can be reduced. By this, since the necessity of a large-scale and expensive press fitting apparatus which can generate a high press fitting load can be obviated, the manufacturing costs of the motor 10 can be reduced. In addition, the generation of a drawback such as seizure in the course of press fitting can be prevented.

Additionally, according to the axial gap motor 10 of this embodiment, since the annular member 125 is press fitted on the outer circumferential portion of the rim portion 23 of the rotor frame 20, stress can be reduced which is generated at roots of the ribs 21 when the rotor 11 rotates at high speeds. By this, since the rotor 11 can be driven to rotate at high speeds, the output of the motor 10 can be increased.

In addition, according to the axial gap motor 10 of this embodiment, since the relief groove 126 is formed along the full circumference of the annular member 125, the phase of the relief groove 126 and the phase of the ribs 21 where stress becomes high do not have to be matched each other with respect to the circumferential direction, thereby making it possible to increase the assembling properties of the motor 10.

Additionally, according to the axial gap motor 10 of this embodiment, since the annular member 125 is made of the non magnetic material, the short circuit of magnetic flux through the annular member 125 can be prevented. By this, a reduction in generated torque of the motor and a reduction in efficiency can be prevented.

In addition, the invention is not limited to the embodiments that have been illustrated heretofore and, hence, can be modified as required without departing from the spirit and scope of the invention.

For example, while in the embodiment, the annular member is attached to the outer circumferential portion of the rim portion of the rotor frame through press fitting, since the annular member only has to be attached in such a manner that compression stress is generated on the rotor frame, the annular member may be so attached through shrink fit.

In addition, while in the embodiment, the relief portion is formed as the recessed relief groove which extends along the full circumference of the annular member, the invention is not limited thereto, and hence, relief portions may be formed independently in positions which correspond to the ribs. However, as this occurs, in consideration of circumferential phase matching between the relief portions and the ribs, the independent relief portions are preferably formed on the rim portion.

What is claimed is:

1. An axial gap motor comprising:
   a rotor rotatable about a rotational axis; and
   a stator disposed to confront the rotor from at least one side thereof in a rotational axis direction,
   wherein the rotor comprises:
   a rotor frame having a plurality of ribs disposed at predetermined intervals in a circumferential direction and extending in a radial direction from the rotational axis, a ring member provided at an inside diameter end of the ribs, and a rim portion provided at an outside diameter end of the ribs;
   main magnet portions magnetized in the rotational axis direction, each main magnet portion being disposed individually between a pair of ribs adjacent to each other in the circumferential direction; and
   a protecting portion formed by a tapered inner surface of the rim portion and a tapered outer surface of the ring member, wherein the tapered inner surface is inclined in a manner to gradually reduce an inside diameter of the rim portion, and the tapered out surface is inclined in a manner to gradually increase an outer diameter of the ring member.

2. An axial gap motor as set forth in claim 1, wherein the rotor comprises a plurality of sub-magnet portions magnetized in a direction orthogonal to the rotational axis direction and a radial direction, each sub-magnet portion being disposed on at least one side of the ribs in the rotational axis direction, and wherein the protecting portion is formed in an area where the sub-magnet portions project in the radial direction in a cross section of the rim portion taken along the rotational axis direction.

3. An axial gap motor as set forth in claim 1, wherein the rotor comprises a plurality of magnetic disposed on at least one side of each main magnet portion in the rotational axis direction, and wherein the protecting portion includes a rigid portion formed in an area where the magnetic members project in the radial direction in a cross section of the rim portion taken along the rotational axis direction.

4. An axial gap motor as set forth in claim 2, wherein the rigid portion is provided by attaching an annular member to an outer circumference of the rim portion.

5. An axial gap motor as set forth in claim 3, wherein the rigid portion is provided by attaching an annular member to an outer circumference of the rim portion.

6. An axial gap motor as set forth in claim 2, wherein the rigid portion is made of a non magnetic material.

7. An axial gap motor as set forth in claim 3, wherein the rigid portion is made of a non magnetic material.

8. An axial gap motor as set forth in claim 1, wherein the rotor comprises an annular member which is press fitted on an outer circumferential portion of the rim portion, and wherein the protecting portion is a relief portion which is provided in an area on a joining surface between the rim portion and the annular member where the ribs are projected in a radial direction.

9. An axial gap motor as set forth in claim 8, wherein the relief portion is provided along a full circumference of the rotor.

10. An axial gap motor as set forth in claim 8, wherein the annular member is made of a non magnetic material.

11. An axial gap motor as set forth in claim 8, wherein the relief portion is formed on an inner circumferential surface of the annular member.

12. An axial gap motor as set forth in claim 1, wherein the ring member further includes an annular portion extending substantially parallel relative to a rib and a collar portion extending from a radially outer end of the annular portion.

13. An axial gap motor as set forth in claim 12, wherein the tapered outer surface of the ring member is formed on an outer circumferential surface of the collar portion.

14. An axial gap motor as set forth in claim 1, wherein the rim portion further includes a flat, plane-like inner surface formed axially centrally and parallel relative to the rotational axis.

15. An axial gap motor as set forth in claim 14, wherein the tapered inn surface of the rim portion extends from each axial side of the flat, plane-like inner surface of the rim portion.

16. An axial gap motor as set forth in claim 14, wherein said each main magnet portion abuts against the flat, plane-like inner surface of the rim portion.

17. An axial gap motor comprising:
    a rotor rotatable about a rotational axis; and
    a stator disposed to confront the rotor from at least one side thereof in a rotational axis direction,
    wherein the rotor comprises:
    a rotor frame having a plurality of ribs disposed at predetermined intervals in a circumferential direction and extending in a radial direction from the rotational axis, a shaft portion provided at an inside diameter end of the ribs, and a rim portion provided at an outside diameter end of the ribs;
    main magnet portions magnetized in the rotational axis direction, each main magnet portion being disposed individually between a pair of ribs adjacent to each other in the circumferential direction; and
    a protecting portion which absorbs or supports pressure received from a magnetic member,
    wherein the magnetic member is disposed on an inner surface of the rim portion,
    wherein the rotor comprises a plurality of magnetic disposed on at least one side of each main magnet portion in the rotational axis direction, and
    wherein the protecting portion includes a rigid portion formed in an area where the magnetic members project in the radial direction in a cross section of the rim portion taken along the rotational axis direction.

18. An axial gap motor as set forth in claim 17, wherein the rotor comprises a plurality of sub-magnet portions magnetized in a direction orthogonal to the rotational axis direction and a radial direction, each sub-magnet portion being disposed on at least one side of the ribs in the rotational axis direction, and wherein the protecting portion is formed in an area where the sub-magnet portions project in the radial direction in a cross section of the rim portion taken along the rotational axis direction.

19. An axial gap motor as set forth in claim 17, wherein the inner surface of the rim portion is inclined in a manner to gradually decrease an inside diameter of the rim portion as the rim portion extends axially outwards from an axial center of the rim portion.

* * * * *